No. 818,765. PATENTED APR. 24, 1906.
A. KAYSSER.
MACHINE FOR CUTTING STOPPERS.
APPLICATION FILED OCT. 2, 1905.
2 SHEETS—SHEET 1.
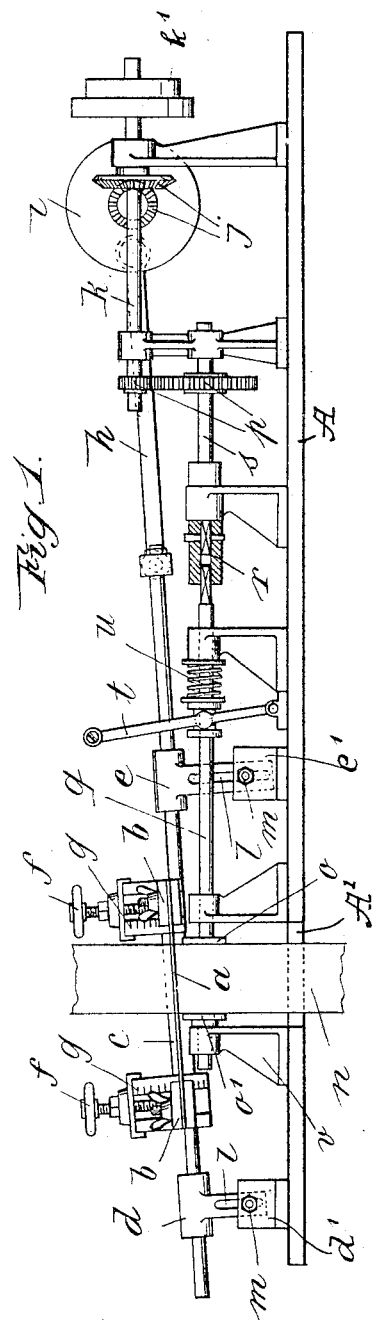
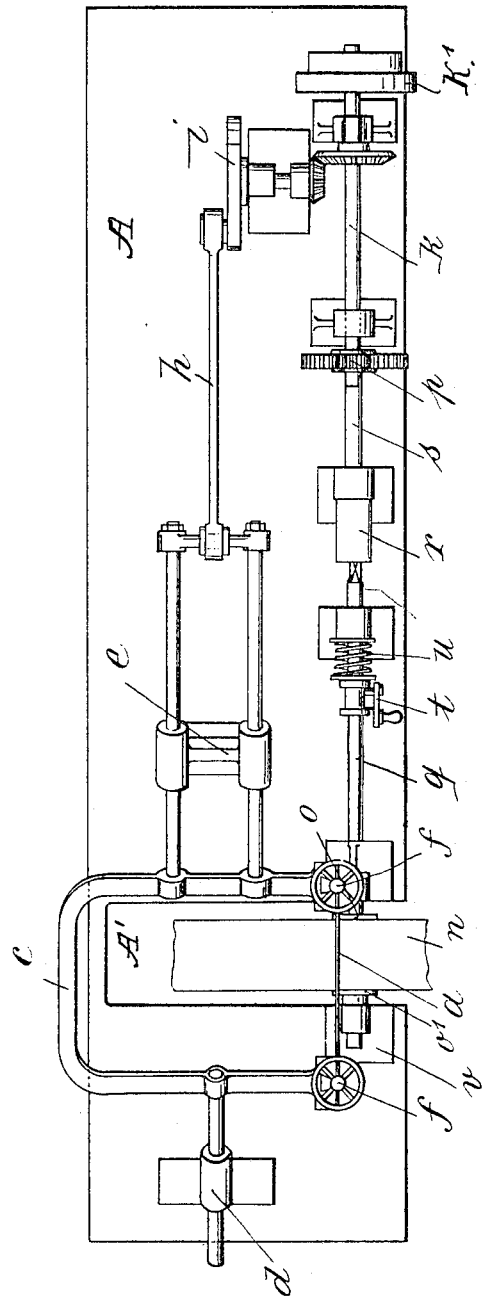
Witnesses:
Inventor:
August Kaysser,
By Briesen & Knauth
Attorneys.

No. 818,765. PATENTED APR. 24, 1906.
A. KAYSSER.
MACHINE FOR CUTTING STOPPERS.
APPLICATION FILED OCT. 2, 1905.
2 SHEETS—SHEET 2.
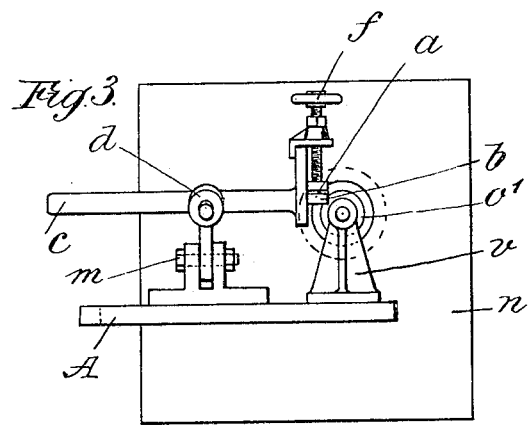
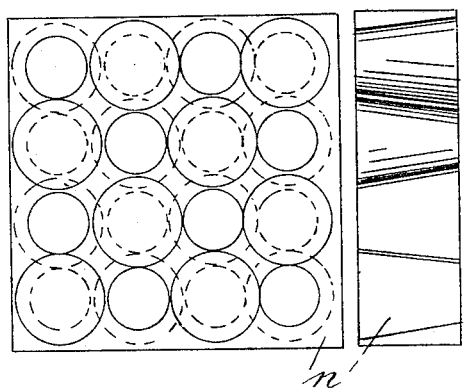
Witnesses:
Inventor:
August Kaysser,
By Briesen & Knauth
Attorneys.

UNITED STATES PATENT OFFICE.

AUGUST KAYSSER, OF HÖCHST-ON-THE-MAIN, GERMANY.

MACHINE FOR CUTTING STOPPERS.

No. 818,765.          Specification of Letters Patent.          Patented April 24, 1906.

Application filed October 2, 1905. Serial No. 281,028.

*To all whom it may concern:*

Be it known that I, AUGUST KAYSSER, merchant, residing at 12 Feldbergstrasse, Höchst-on-the-Main, in the Kingdom of Prussia, Germany, have invented certain new and useful Improvements in Machines for Cutting Stoppers, of which the following is a specification.

Hitherto stoppers—of cork, for example—have been made by cutting a cube of the raw material and fashioning the cylindrical or conical stopper therefrom either by hand or by a planing-machine, or the stoppers have been cut by a special boring-machine from a plate of the raw material. Both methods always occupy much time and entail much waste.

The present invention relates to a machine for cutting stoppers which avoids these objections in that it cuts the stoppers by an adjustable narrow band-knife from a rotating plate of the raw material sufficient in size to make a plurality of stoppers, the different conicities of the stoppers being obtained by varying the oblique position of the knife.

In order that, especially in the manufacture of conical stoppers, loss of material may be reduced to a minimum, after each stopper has been cut the plate of raw material is turned.

The accompanying drawings illustrate a machine made according to the invention.

Figure 1 is a side elevation; Fig. 2, a plan, and Fig. 3 an end elevation. Fig. 4 shows how the conical stoppers are cut from a plate of the raw material.

The frame of the machine may be constructed in any suitable or desirable form; but it is essential that the means for rotating the raw material be so located with reference to the frame or that the latter be so formed as to provide space for the rotation of a plate of raw material of sufficient size to make a plurality of stoppers. In the machine illustrated in the drawings the main frame consists of a bed-plate A, upon which are mounted suitable standards and guides for the rotating and cutting mechanism. Said bed-plate is provided with a recess A', which affords the necessary space for the rotation of the plate of raw material $n$; but said recess will not be necessary if the rotating means be located a sufficient distance above the bed-plate.

A fine band-knife $a$ is stretched by means of clamps $b$ in a stirrup $c$, which is carried in two guides $d\ e$. The clamps $b$ can be accurately adjusted by screws $f$ with reference to a scale $g$. The stirrup-frame $c$ is driven to and fro in the guides $d\ e$ by a crank $i$ and connecting-rod $h$. The crank is revolved, through bevel-gear $j$, from the shaft $k$, carrying a belt-pulley $k'$. The guides $d\ e$ can be adjusted to bring the frame $c$ to the inclination proper for the conicity of the stopper by aid of clamping-screws $m$, which pass through slots $l$ in the guides and hold them to suitable supports $d'\ e'$, respectively.

The plate $n$, of raw material, from which the corks are to be cut, is held between the two disks $o\ o'$, of which $o$ is rotated by toothed gear $p$ from the shaft $k$, and for this purpose is mounted on a shaft $q$, which can slide axially and can be connected by a clutch $r$ with the shaft $s$, which is turned by the said gear $p$. By means of a lever $t$ the disk $o$ can be withdrawn from the plate $n$, so that the latter can be removed. A spring $u$ keeps the disk $o$ against the plate $n$. The disk $o'$ can rotate in a bearing carried by an upright $v$.

The operation of the machine is as follows: The lever $t$ is turned to draw back the disk $o$ against the pressure of spring $u$, and a plate of, say, cork is introduced between the disks $o\ o'$, whereupon the lever $t$ is left free and the plate is firmly held between the disks. By adjusting the guides $d$ and $e$ of the frame $c$ by loosening the screws $m$ and sliding the guides $l$ thereon the knife $a$ is given the inclination proper for the desired conicity of the stopper, while to produce a cork of the desired diameter the position of the knife is adjusted by adjusting the clamps $b$ by turning the screws $f$. When the shaft $k$ is set in rotation, the crank $i$ gives a reciprocating motion to the frame $c$ and knife $a$ through the connecting-rod $h$, while at the same time the gearing $p$ drives the shaft $s$ and through the coupling $r$ the disk $o$, so that the cork plate $n$ is also revolved. When a stopper has been cut out, the plate $n$ is removed and turned over, so that closely against the place where the first stopper was cut another is cut and the waste is very small. This is apparent from Fig. 4. When the knife $a$ is adjusted parallel to the common axis of disks $o\ o'$, cylindrical stoppers are cut.

Now what I claim, and desire to secure by Letters Patent, is the following:

1. A machine for cutting stoppers out of a plate of raw material of sufficient size to make a plurality of stoppers, comprising a frame carrying devices for rotating said plate and providing space for its rotation, and a slender band-knife of such proportions in cross-section as to permit it to describe a circle within the plate to excise the stoppers, said knife being supported from its ends by means leaving space for the plate to travel around the knife.

2. A machine for cutting stoppers out of a plate of raw material of sufficient size to make a plurality of stoppers, comprising a frame carrying devices for rotating said plate and providing space for its rotation, and a slender traveling band-knife of such proportions in cross-section as to permit it to describe a circle within the plate to excise the stoppers, said knife being supported by means leaving space for the plate to travel around the knife.

3. A machine for cutting stoppers out of a plate of raw material of sufficient size to make a plurality of stoppers, comprising a frame carrying devices for rotating said plate and providing space for its rotation, a slender band-knife of such proportion in cross-section as to permit it to describe a circle within the plate to excise the stoppers, said knife being supported by means leaving space for the plate to travel around the knife and means for adjusting said knife angularly with respect to the axis of rotation of said plate.

4. A machine for cutting stoppers out of a plate of raw material of sufficient size to make a plurality of stoppers, comprising a frame carrying devices for rotating said plate and providing space for its rotation, a slender band-knife of such proportions in cross-section as to permit it to describe a circle within the plate to excise the stoppers, said knife being supported from its ends by means leaving space for the plate to travel around the knife, and means for reciprocating said knife.

In testimony that I claim the foregoing as my invention I have signed my name, in presence of two witnesses, this 21st day of September, 1905.

AUGUST KAYSSER.

Witnesses:
 EVA SATTLER,
 ROBERT BÜHL.